US010393215B2

(12) United States Patent
Yao

(10) Patent No.: US 10,393,215 B2

(45) Date of Patent: Aug. 27, 2019

(54) APPARATUS FOR DAMPING MACHINING VIBRATION OF AN OBJECT

(71) Applicant: ROLLS-ROYCE PLC, London (GB)

(72) Inventor: Shaoming Yao, Sheffield (GB)

(73) Assignee: ROLLS-ROYCE plc, London (GB)

( * ) Notice: Subject to any disclaimer, the term of this patent is extended or adjusted under 35 U.S.C. 154(b) by 303 days.

(21) Appl. No.: 14/990,410

(22) Filed: Jan. 7, 2016

(65) Prior Publication Data

US 2016/0223049 A1 Aug. 4, 2016

(30) Foreign Application Priority Data

Jan. 29, 2015 (GB) .................................. 1501461.6

(51) Int. Cl.

| | |
|---|---|
| ***F16F 15/00*** | (2006.01) |
| ***B23Q 11/00*** | (2006.01) |
| ***F16F 1/373*** | (2006.01) |
| ***B23Q 3/06*** | (2006.01) |
| ***F01D 25/24*** | (2006.01) |

(52) U.S. Cl.

CPC ............. *F16F 15/00* (2013.01); *B23Q 3/062* (2013.01); *B23Q 11/0032* (2013.01); *F01D 25/24* (2013.01); *F16F 1/3737* (2013.01); *F05D 2220/30* (2013.01); *F05D 2230/10* (2013.01); *F05D 2230/80* (2013.01); *F05D 2240/60* (2013.01)

(58) Field of Classification Search

CPC ........ F16F 15/00; F16F 1/3737; F16F 1/3821; F16F 9/306; F16L 55/0335; F16L 55/0337; F16D 25/24; B23Q 3/062; B23Q 11/0032; B24B 41/06

See application file for complete search history.

(56) References Cited

U.S. PATENT DOCUMENTS

| | | | |
|---|---|---|---|
| 3,774,472 | A | 11/1973 | Mitchell |
| 2012/0133103 | A1 | 5/2012 | Marshall et al. |
| 2014/0159293 | A1 | 6/2014 | George |

FOREIGN PATENT DOCUMENTS

| | | | |
|---|---|---|---|
| EP | 2 615 326 | A1 | 7/2013 |
| FR | 2 519 276 | A1 | 7/1983 |
| GB | 899035 | A | 6/1962 |

(Continued)

OTHER PUBLICATIONS

Jun. 9, 2016 Search Report issued in European Patent Application No. 16 15 0413.

(Continued)

*Primary Examiner* — Thomas C Diaz

(74) *Attorney, Agent, or Firm* — Oliff PLC

(57) ABSTRACT

Apparatus for damping machining vibration of an object, the apparatus including: a plurality of rigid members to be positioned around the object to be machined, the plurality of rigid members defining an interior surface and an exterior surface; at least one flexible member positioned adjacent the interior surface of the plurality of rigid members, the at least one flexible member for contacting an exterior surface of the component; and a compressor to be positioned around the plurality of rigid members and the at least one flexible member, the compressor being arranged to compress the at least one flexible member onto an exterior surface of the object.

18 Claims, 9 Drawing Sheets

(56) References Cited

FOREIGN PATENT DOCUMENTS

| | | | | |
|---|---|---|---|---|
| GB | 2 447 278 A | 9/2008 | | |
| JP | H06-155290 A | 6/1994 | | |
| JP | 3249612 B2 * | 1/2002 | ............ | B24B 33/10 |
| WO | 2010/094382 A1 | 8/2010 | | |

OTHER PUBLICATIONS

Jul. 9, 2015 Search Report issued in British Patent Application No. GB1501461.6.

* cited by examiner

APPARATUS FOR DAMPING MACHINING VIBRATION OF AN OBJECT

The present disclosure concerns apparatus for damping machining vibration of an object.

TECHNOLOGICAL FIELD

An object, such as a shaft or casing of a gas turbine engine, may require machining when manufacturing or repairing the object. For example, machining may include holding the object in place while a cutting tool removes a portion of the object to achieve a desired profile. The machining operation may cause the object to vibrate and such vibrations may damage the object, or may result in the object having undesirable features (such as poor surface finish).

BRIEF SUMMARY

According to various, but not necessarily all, embodiments of the invention there is provided apparatus for damping machining vibration of an object, the apparatus comprising: a plurality of rigid members to be positioned around the object to be machined, the plurality of rigid members defining an interior surface and an exterior surface; at least one flexible member positioned adjacent the interior surface of the plurality of rigid members, the at least one flexible member for contacting an exterior surface of the object; and a compressor to be positioned around the plurality of rigid members and the at least one flexible member, the compressor being arranged to compress the at least one flexible member onto an exterior surface of the object.

The at least one flexible member may comprise a resilient material.

The plurality of rigid members and the at least one flexible member may define a circular cross sectional shape.

The plurality of rigid members and the at least one flexible member may define an elliptical cross sectional shape.

The plurality of rigid members and the at least one flexible member may define a cylindrical shape.

The plurality of rigid members and the at least one flexible member may define a conical shape.

The compressor may comprise: an elongate flexible member for extending around the plurality of rigid members and the at least one flexible member; and a fastener for fastening the elongate flexible member around the plurality of rigid members and the at least one flexible member.

The plurality of rigid members may each have a length and a width. The elongate flexible member may have a width that is less than the length of the plurality of rigid members.

The plurality of rigid members may each have a length and a width. The elongate flexible member may have a width that is substantially equal to the length of the plurality of rigid members.

The fastener may comprise a ratchet or a bolt lock for fastening opposing open ends of the elongate flexible member.

The apparatus may further comprise a plurality of flexible members positioned adjacent the interior surface of the plurality of rigid members. The plurality of flexible members may be for contacting an exterior surface of the object.

According to various, but not necessarily all, embodiments of the invention there is provided an arrangement comprising: apparatus as described in any of the preceding paragraphs; an object to be machined. The apparatus may be positioned around an exterior surface of the object to dampen machining vibrations of the object.

The arrangement may further comprise a further apparatus as described in any of the preceding paragraphs. The further apparatus may be positioned around another surface of the object to dampen machining vibrations of the object.

The object may be a component of a gas turbine engine.

The component may be a casing or a shaft of the gas turbine engine.

According to various, but not necessarily all, embodiments of the invention there is provided a method for damping machining vibration of an object, the method comprising: providing apparatus as described in any of the preceding paragraphs around an object; and compressing the at least one flexible member of the apparatus onto an exterior surface of the object.

The method may further comprise: machining the object while the object is being compressed by the apparatus.

The skilled person will appreciate that except where mutually exclusive, a feature described in relation to any one of the above aspects may be applied mutatis mutandis to any other aspect.

BRIEF DESCRIPTION

Examples will now be described with reference to the Figures, in which.

DETAILED DESCRIPTION

In the following description, the terms: 'connect'; 'couple'; 'contact'; and 'abut', mean: operationally connected, operationally coupled, operationally contacting, and operationally abutting. It should be appreciated that where these terms are used, there may be any number of intervening components between the mentioned features, including no intervening components.

Figure 1:
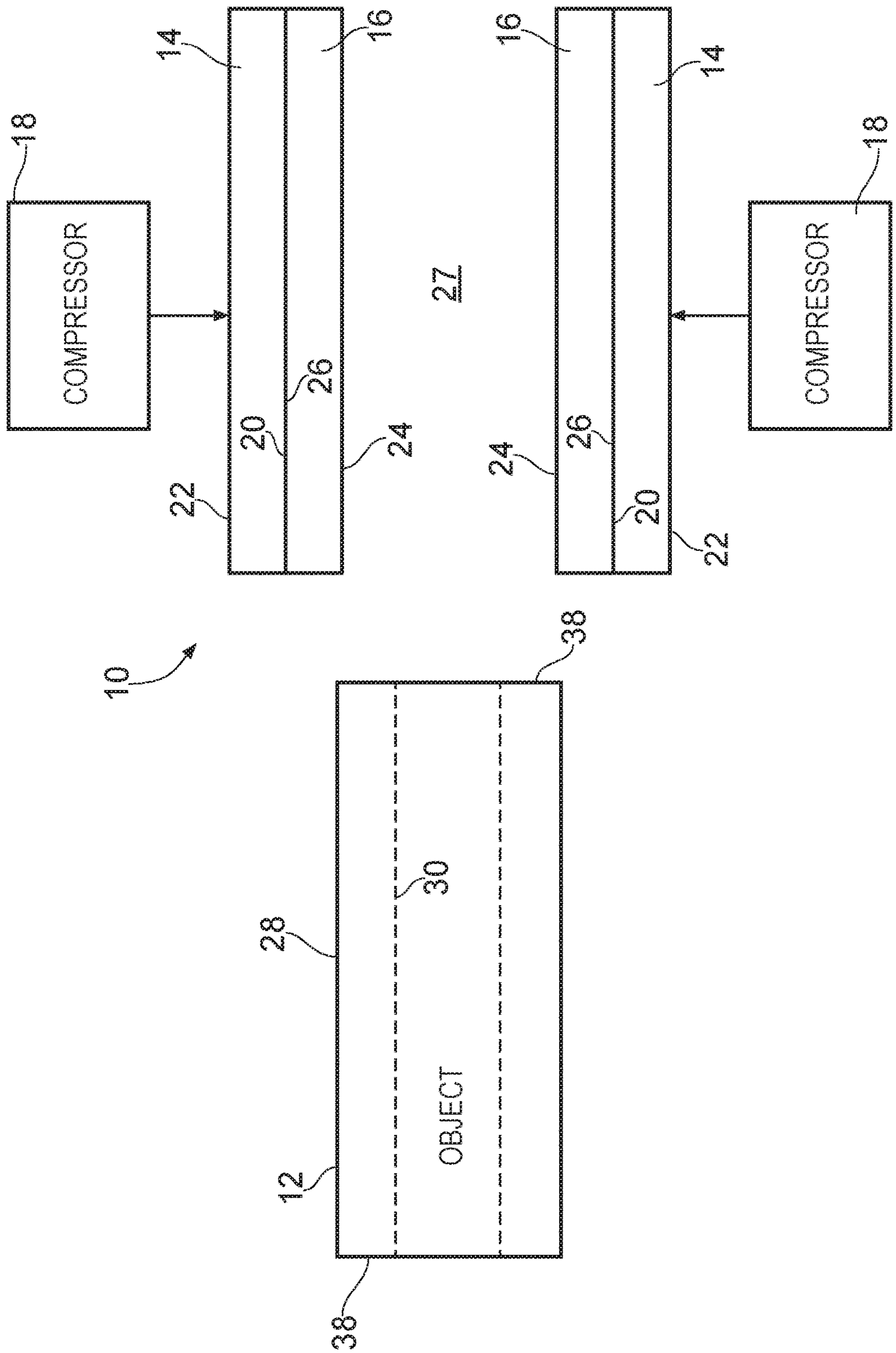
FIG. 1 illustrates a schematic cross sectional diagram of a first apparatus for damping machining vibration, and an object.

FIG. 1 illustrates a schematic cross sectional diagram of a first apparatus 10 and an object 12 to be machined. In summary, the first apparatus 10 may be provided around the object 12 to provide a compressive force to at least a part of the exterior of the object 12. The object 12 may then be machined by an engineer using one or more machining tools (for example, a blending tool or a honing tool). The first apparatus 10 may dampen machining vibrations of the object 12 while the object 12 is being machined by the machining tool.

In more detail, the first apparatus 10 includes a plurality of rigid members 14, at least one flexible member 16, and a compressor 18. The plurality of rigid members 14 are to be positioned around the object 12 to be machined, and may be elongate in shape (for example, they may have a length greater than their width and may therefore have a bar shape or a rod shape). The rigid members 14 define an interior surface 20 and an exterior surface 22. The plurality of rigid members 14 may comprise any suitable material and may comprise a metal, or a rigid plastic.

The at least one flexible member 14 is positioned adjacent the interior surface 20 of the plurality of rigid members 14. The at least one flexible member 16 includes an interior surface 24 and an exterior surface 26. The interior surface 24 defines a cavity 27 for receiving the object 12 therein and consequently, the interior surface 24 is arranged to contact an exterior surface 28 of the object 12. The at least one flexible member 16 may comprise any suitable material and may comprise a resilient material such as rubber, or a viscoelastic material such as silicone rubber. The viscoelastic material may have a hardness Shore A (DIN53505) from 5 to 100° or from 10 to 80°. In an example where the viscoelastic material is silicone rubber, the viscoelastic material may have a shore hardness of 25, a tensile strength of 6.0 MPa, a tear strength of 16.0 N/MM MIN, elongation at break of 350%, and a rebound resilience of 30%.

In some examples, the exterior surface 26 of the at least one flexible member 16 may be coupled to the interior surface 20 of the plurality of rigid members 14 (for example, they may be coupled via an adhesive). In other examples, the exterior surface 26 of the at least one flexible member 16 may not be coupled to the interior surface 20 of the plurality of rigid members 16.

The at least one flexible member 16 may be a single member that extends over (at least a part of) the interior surfaces 20 of the plurality of rigid members 14 and also between the plurality of rigid members 14. The flexible member 16 may be an endless loop, or may have two open ends. Alternatively, a plurality of the discrete flexible members 16 may extend over only (at least a part of) the interior surfaces 20 of the plurality of rigid members 14, and not between the plurality of rigid members 14.

The compressor 18 is for positioning around the plurality of rigid members 14 and the at least one flexible member 16. The compressor 18 is arranged to compress the at least one flexible member 16 onto an exterior surface of the object 12. Where the plurality of rigid members 14 are not coupled to the at least one flexible member 16, the compressor 18 may secure the plurality of rigid members 14 and the at least one flexible member 16 in position on the object 12.

The compressor 18 may be any suitable device for providing a compressive force to the plurality of rigid members 14 and the at least one flexible member 16. For example, the compressor 18 may comprise: an elongate flexible member (such as a belt or a sleeve) for extending around the plurality of rigid members and the at least one flexible member; and a fastener (such as a ratchet or a bolt lock) for fastening the elongate flexible member around the plurality of rigid members and the at least one flexible member. Alternatively, the compressor 18 may comprise a plurality of pneumatic cylinders arranged around the plurality of rigid members 14 and may be arranged to compress the at least one flexible member 16 onto an exterior surface of the object 12.

The object 12 may be any object to be machined and includes an exterior surface 28 and may include an interior surface 30. For example, the object 12 may be a component of a gas turbine engine, and may be a shaft or a casing of a gas turbine engine. In other examples, the object 12 may be a component of another mechanical system, such as an automotive component (for example, an axle for a car).

Figure 2:
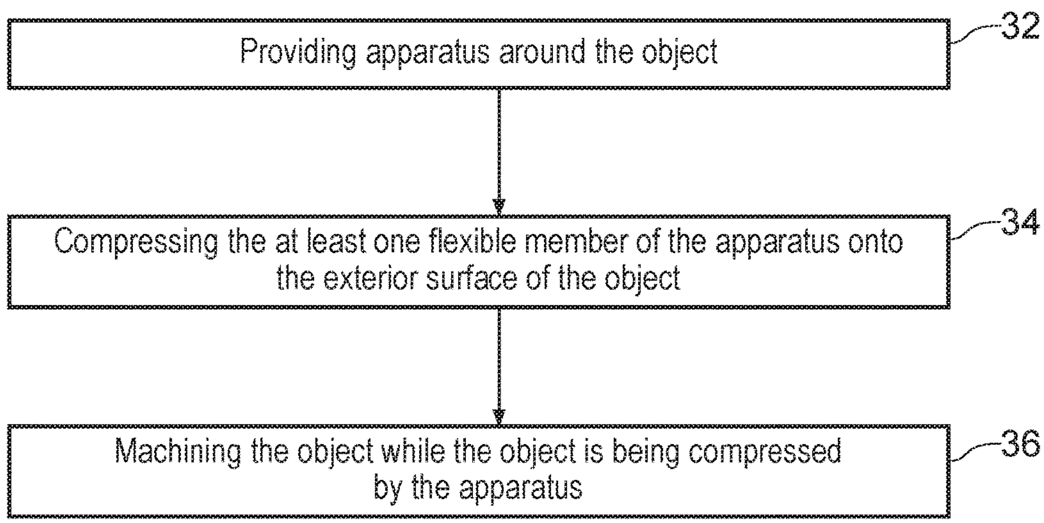
FIG. 2 illustrates a flow diagram of a method for damping machining vibration of an object according to various examples.

FIG. 2 illustrates a flow diagram of a method for damping machining vibration of an object 12 according to various examples.

At block 32, the method includes providing the apparatus 10 around the object 12. In some examples, block 32 may be performed by wrapping the plurality of rigid members 14 and the at least one flexible member 16 around at least a part of the exterior surface 28 of the object 12. In other examples, block 32 may be performed by inserting the object 12 into the cavity 27 defined by the apparatus 10.

At block 34, the method includes compressing the at least one flexible member 16 of the apparatus 10 onto the exterior surface 28 of the object 12. In examples where the compressor 18 includes an elongate flexible member and a fastener, block 34 may be performed by wrapping the elongate flexible member around the plurality of rigid members 14 and then fastening the elongate flexible member in place using the fastener. Where the elongate flexible member is coupled to the plurality of rigid members 14, the elongate flexible member may be wrapped around the plurality of rigid members 14 in block 32, and in block 34, the at least one flexible member 16 is compressed onto the exterior surface 28 of the object 12 by fastening the fastener of the compressor.

At block 36, the method includes machining the object 12 while the object 12 is being compressed by the apparatus 10. For example, the object 12 may be machined by inserting a machining tool within the object 12 to machine the interior surface 30. Alternatively or additionally, the object 12 may be machined by machining a side surface 38 of the object 12.

Once block 36 has been completed, the apparatus 10 may be removed from the object 12 (that is, by removing the object 12 from the cavity 27 of the apparatus 10, or by unwrapping the apparatus 10 from around the object 12).

The apparatus 10 may provide several advantages. First, the apparatus 10 may enable the object 12 to be dampened reliably while machining is being carried out on the object 12. In particular, the compressor 18 may provide a consistent compressive force to each of the plurality of rigid members 14 and consequently, a consistent preload may be applied (even if the apparatus 10 and the object 12 combination are being rotated at a relatively high speed during machining) to the at least one flexible member 16 around the perimeter of the exterior surface 28 of the object 12. Second, the apparatus 10 may enable bending vibrations in the object 12 to be suppressed. For example, where the plurality of rigid members 14 extend along at least a part of the length of an object 12, the plurality of rigid members 14 may suppress bending vibrations at least along that part of the length of the object 12.

Figure 3:
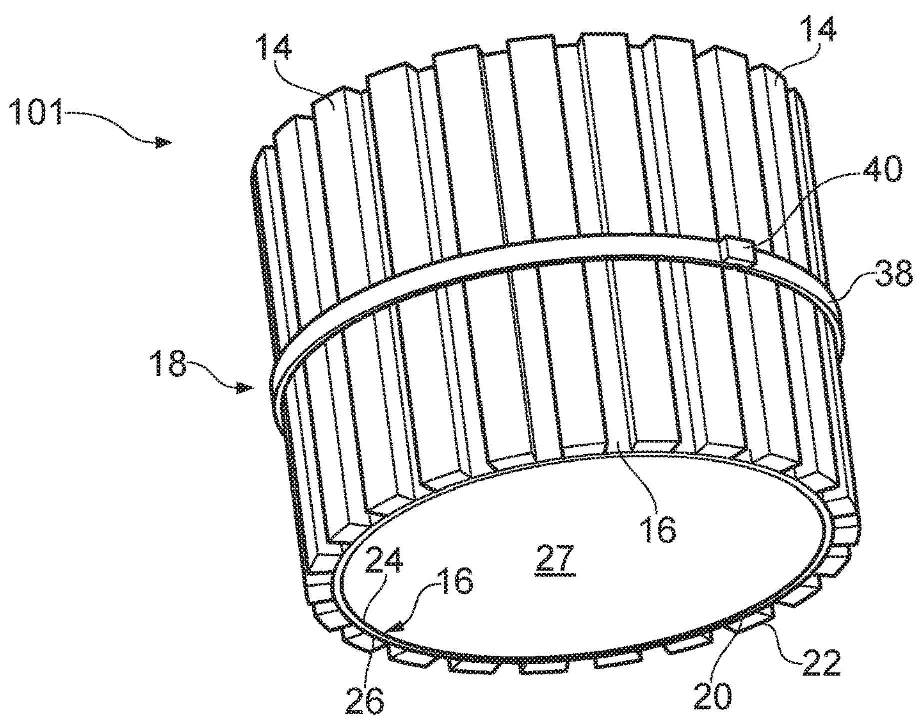
FIG. 3 illustrates a perspective view diagram of a second apparatus for damping machining vibration according to various examples.

FIG. 3 illustrates a perspective view diagram of a second apparatus 101 for damping machining vibration according to various examples. The second apparatus 101 is similar to the first apparatus 10 illustrated in FIG. 1 and where the features are similar, the same reference numerals are used. The second apparatus 101 includes a plurality of rigid members 14, a flexible member 16, and a compressor 18 including an elongate flexible member 38 and a ratchet 40.

The plurality of rigid members 14 comprises a plurality of rigid bars having a width and a length (where the length is greater than the width). The plurality of rigid members 14 has a circular cross sectional shape which is consistent along the length of the rigid members 14 (the plurality of rigid members 14 consequently has a cylindrical shape).

Figure 4:
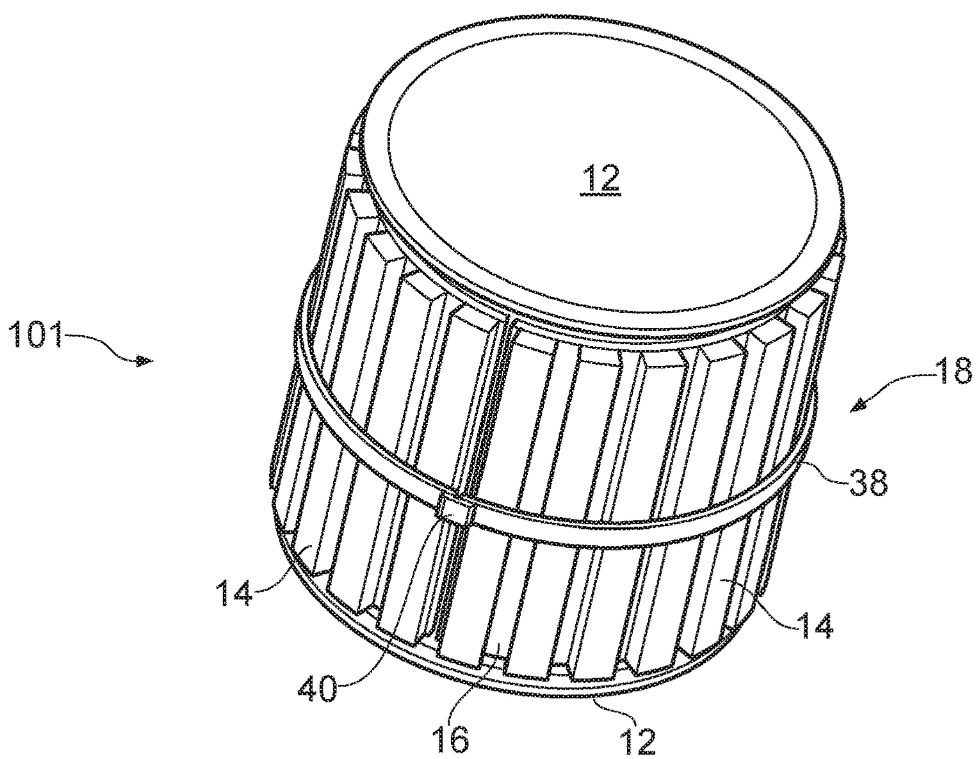
FIG. 4 illustrates a perspective view diagram of the second apparatus illustrated in FIG. 3, and an object.

The flexible member 16 extends over the interior surfaces 20 of the plurality of rigid members 14 and also over the gaps between adjacent rigid members 14. The flexible member 16 has a circular cross sectional shape which is consistent along the length of the flexible member 16 (that is, the flexible member 16 has a cylindrical shape) and defines a cavity 27 for receiving an object 12 therein (as illustrated in FIG. 4).

The elongate flexible member 38 (which may also be referred to as a belt) extends around the perimeter of the plurality of rigid members 14 at a position that is approximately halfway along the length of the rigid members 14. The elongate flexible member 38 consequently has a circular cross sectional shape when viewed in plan. The elongate flexible member 38 has a width that is less than the length of the plurality of rigid members 14. The ratchet 40 is arranged to fasten the two open ends of the elongate flexible member 38 together. Advantageously, the preload applied by the elongate flexible member 16 on the object 12 may be adjusted by moving the elongate flexible member 38 through the ratchet 40 to tighten the elongate flexible member 38 around the plurality of rigid members 14.

Figure 5:
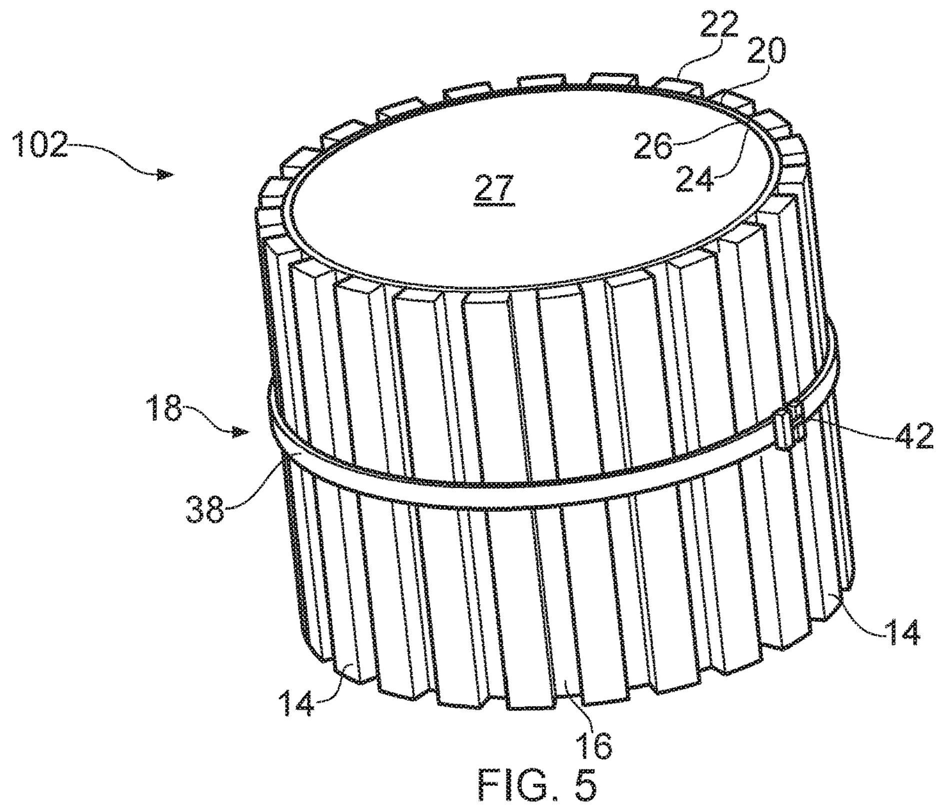
FIG. 5 illustrates a perspective view diagram of a third apparatus for damping machining vibration according to various examples.

FIG. 5 illustrates a perspective view of a third apparatus 102 for damping machining vibration according to various examples. The third apparatus 102 is similar to the first apparatus 10 and to the second apparatus 101, and where the features are similar, the same reference numerals are used. The third apparatus 102 includes a plurality of rigid members 14, a flexible member 16, and a compressor 18 including an elongate flexible member 38 and a lock bolt 42.

The plurality of rigid members 14 comprises a plurality of rigid bars having a width and a length (where the length is greater than the width). The plurality of rigid members 14 has a circular cross sectional shape which is consistent along the length of the rigid members 14 (the plurality of rigid members 14 consequently define a cylindrical shape).

Figure 6:
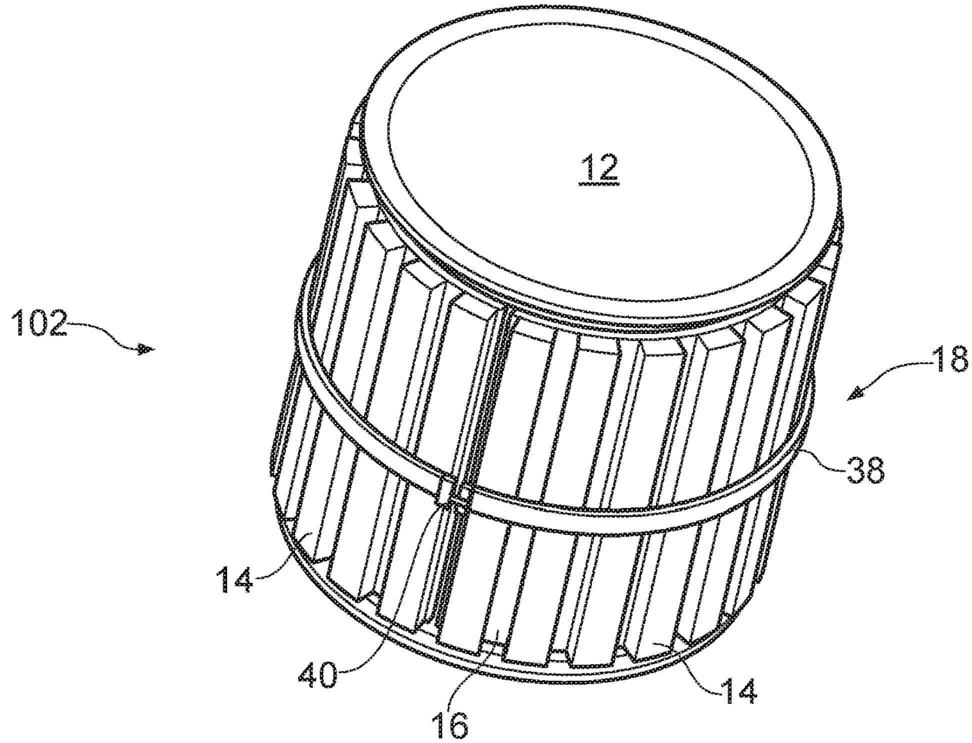
FIG. 6 illustrates a perspective view diagram of the third apparatus illustrated in FIG. 5, and an object.

The flexible member 16 extends over the interior surfaces 20 of the plurality of rigid members 14 and also over the gaps between adjacent rigid members 14. The flexible member 16 has a circular cross sectional shape which is consistent along the length of the flexible member 16 (that is, the flexible member 16 has a cylindrical shape) and defines a cavity 27 for receiving an object 12 therein (as illustrated in FIG. 6).

The elongate flexible member 38 (which may also be referred to as a belt) extends around the perimeter of the plurality of rigid members 14 at a position that is approximately halfway along the length of the rigid members 14. The elongate flexible member 38 consequently has a circular cross sectional shape when viewed in plan. The elongate flexible member 38 has a width that is less than the length of the plurality of rigid members 14. The lock bolt 42 is arranged to fasten the two ends of the elongate flexible member 38 together. Advantageously, the preload applied by the elongate flexible member 16 on the object 12 may be adjusted by moving the elongate flexible member 16 through the lock bolt 42, and then tightening the lock bolt 42 using a torque wrench to secure the elongate flexible member 38 around the plurality of rigid members 14.

Figure 7:
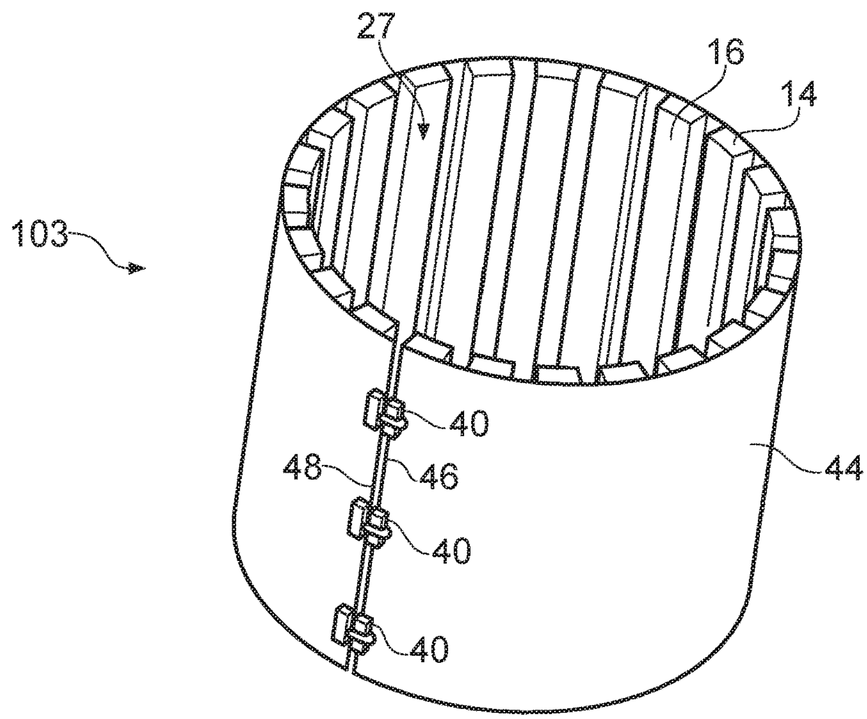
FIG. 7 illustrates a perspective view diagram of a fourth apparatus for damping machining vibration according to various examples.

FIG. 7 illustrates a perspective view of a fourth apparatus 103 for damping machining vibration according to various examples. The fourth apparatus 103 is similar to the first apparatus 10, the second apparatus 101, and the third apparatus 102, and where the features are similar, the same reference numerals are used. The fourth apparatus 103 includes a plurality of rigid members 14, a flexible member 16, and a compressor 18 including an elongate flexible member 44 and a plurality of lock bolts 42.

The plurality of rigid members 14 comprises a plurality of rigid bars having a width and a length (where the length is greater than the width). The plurality of rigid members 14 has a circular cross sectional shape which is consistent along the length of the rigid members 14 (the plurality of rigid members 14 consequently define a cylindrical shape).

Figure 8:
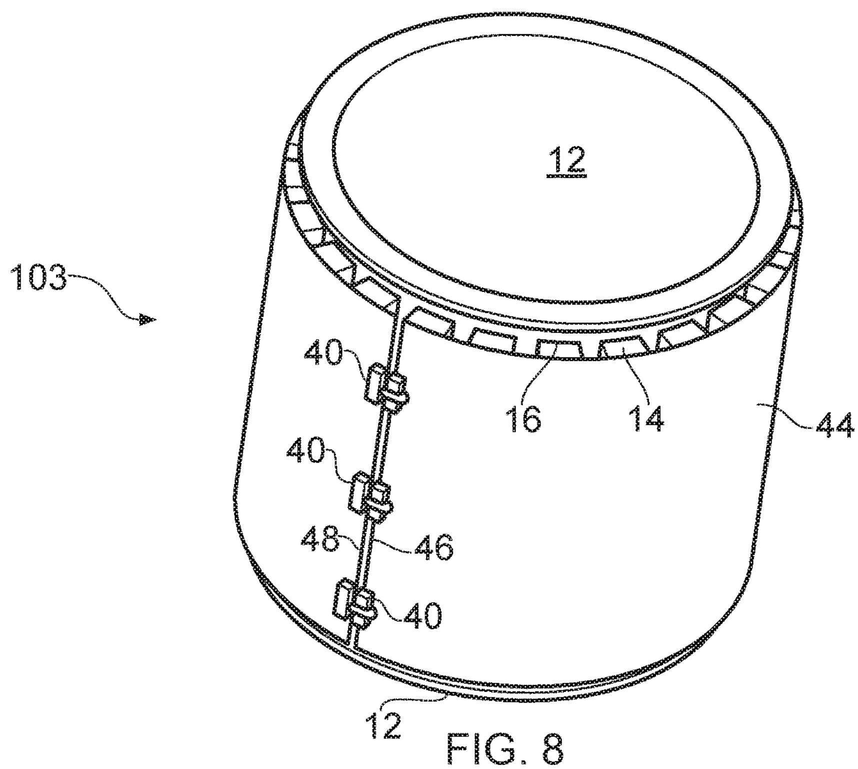
FIG. 8 illustrates a perspective view diagram of the fourth apparatus illustrated in FIG. 7, and an object.

A plurality of discrete flexible members 16 extends over the interior surfaces 20 of the plurality of rigid members 14, but not over the gaps between adjacent rigid members 14. The plurality of flexible members 16 has a circular cross sectional shape which is consistent along the length of the flexible members 16 (that is, the flexible members 16 define a cylindrical shape) and define a cavity 27 for receiving an object 12 therein (as illustrated in FIG. 8).

The elongate flexible member 44 (which may also be referred to as a sleeve) extends around the perimeter of the plurality of rigid members 14 and has a circular cross sectional shape when viewed in plan. The elongate flexible member 44 has a width that is substantially equal to the length of the plurality of rigid members 14 and may consequently extend over the whole length of the plurality of rigid members 14. The plurality of lock bolts 42 are arranged to fasten the two open ends 46, 48 of the elongate flexible member 44 together. Advantageously, the preload applied by the flexible members 16 on the object 12 may be consistent along the length of the flexible members 16 due to the elongate flexible member 44 extending along the whole length of the rigid members 14.

Figure 9:
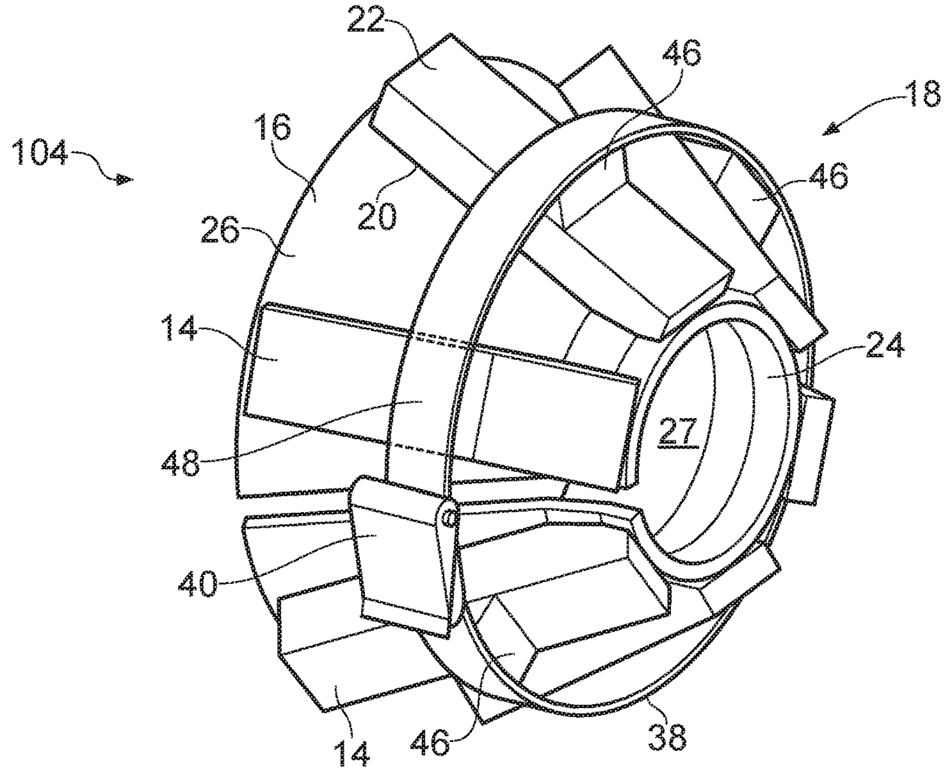
FIG. 9 illustrates a perspective view diagram of a fifth apparatus for damping machining vibration according to various examples.

FIG. 9 illustrates a perspective view of a fifth apparatus 104 for damping machining vibration according to various examples. The fifth apparatus 104 is similar to the first apparatus 10, the second apparatus 101, the third apparatus 102, and the fourth apparatus 103 and where the features are similar, the same reference numerals are used. The fifth apparatus 104 includes a plurality of rigid members 14, a flexible member 16, and a compressor 18 including an elongate flexible member 38 and a ratchet 40.

The plurality of rigid members 14 comprises a plurality of rigid bars having a width and a length (where the length is greater than the width). The plurality of rigid members 14 has a circular cross sectional shape which increases in surface area from a first end of the rigid members 14 towards a second end of the rigid members 14 (the plurality of rigid members 14 consequently define a conical shape).

The plurality of rigid members 14 each comprise a flange 46 that extends from a position approximately halfway along the length of the rigid members 14. The flanges 46 each comprise a surface 48 for receiving the elongate flexible member 38 thereon. The surfaces 48 have a circular cross sectional shape when viewed in cross section that is constant along the length of the surfaces 48 (and consequently, the surfaces 48 define a cylindrical shape). The surfaces 48 advantageously enable the elongate flexible member 38 to be provided and fastened around the conical shaped rigid members 38 with a reduced chance of slipping from the rigid members 14.

Figure 10:
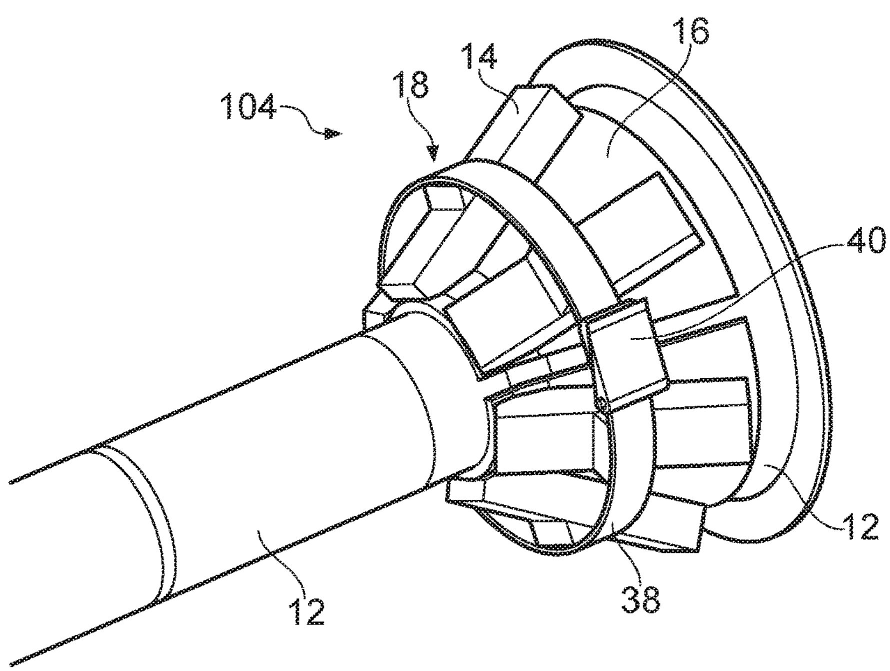
FIG. 10 illustrates a perspective view diagram of the fifth apparatus illustrated in FIG. 9, and an object.

The flexible member 16 extends over the interior surfaces 20 of the plurality of rigid members 14 and also over the gaps between adjacent rigid members 14. The flexible member 16 has a circular cross sectional shape which increases in surface area from a first end of the flexible member 16 towards a second end of the flexible member 16 (the flexible member 16 consequently has a conical shape that corresponds to the conical shape defined by the interior surfaces 20 of the rigid members 14). The flexible member 16 advantageously defines a conical cavity 27 for receiving a conical object 12 therein (as illustrated in FIG. 10).

The elongate flexible member 38 (which may also be referred to as a belt) extends around the perimeter of the plurality of rigid members 14 on the surfaces 48 at a position that is approximately halfway along the length of the rigid members 14. The elongate flexible member 38 consequently has a circular cross sectional shape when viewed in plan. The elongate flexible member 38 has a width that is less than the length of the plurality of rigid members 14. The ratchet 40 is arranged to fasten the two open ends of the elongate flexible member 38 together.

Figure 11:
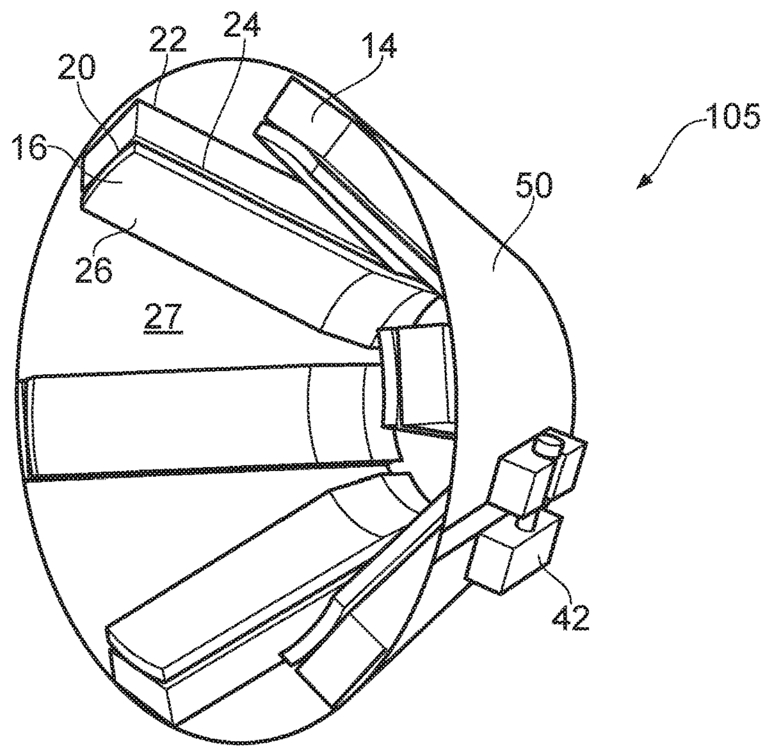
FIG. 11 illustrates a perspective view diagram of a sixth apparatus for damping machining vibration according to various examples.

FIG. 11 illustrates a perspective view of a sixth apparatus 105 for damping machining vibration according to various examples. The sixth apparatus 105 is similar to the first apparatus 10, the second apparatus 101, the third apparatus 102, the fourth apparatus 103, and the fifth apparatus 104 and where the features are similar, the same reference numerals are used. The sixth apparatus 105 includes a plurality of rigid members 14, a plurality of flexible members 16, and a compressor 18 including an elongate flexible member 50 and a lock bolt 42.

The plurality of rigid members 14 comprises a plurality of rigid bars having a width and a length (where the length is greater than the width). The plurality of rigid members 14 has a circular cross sectional shape which is increases from a first end to a second end of the rigid members 14 (the plurality of rigid members 14 consequently define a conical shape).

Figure 12:
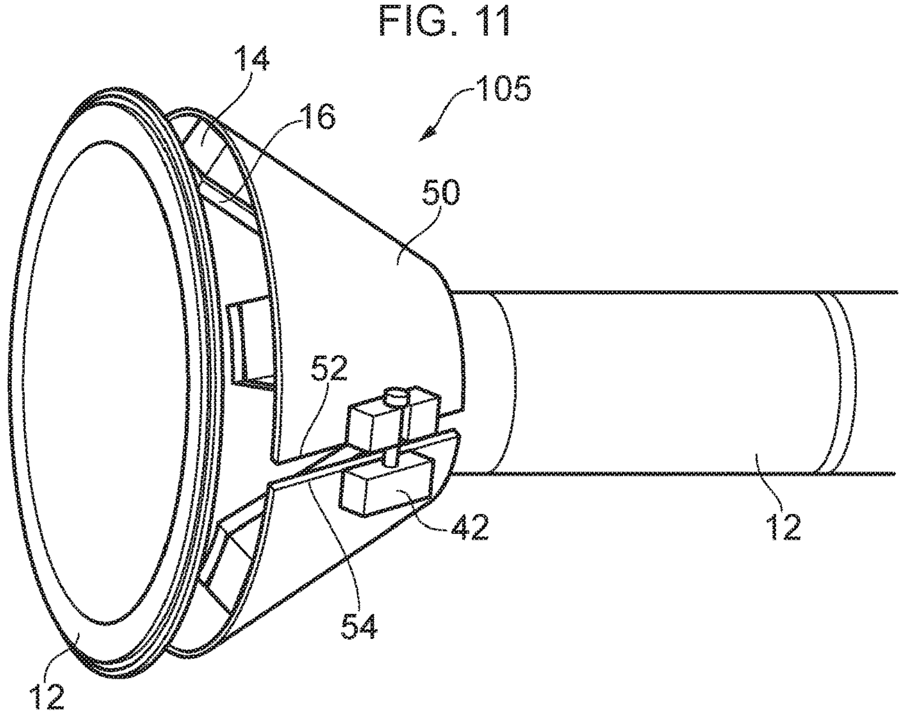
FIG. 12 illustrates a perspective view diagram of the sixth apparatus illustrated in FIG. 11, and an object.

A plurality of discrete flexible members 16 extend over the interior surfaces 20 of the plurality of rigid members 14, but not over the gaps between adjacent rigid members 14. The plurality of flexible members 16 has a circular cross sectional shape that increases in surface area from a first end to a second end of the flexible members 16 (that is, the flexible members 16 define a conical shape that corresponds to the conical shape defined by the interior surfaces 20 of the rigid members 14) and define a conical cavity 27 for receiving a conical object 12 therein (as illustrated in FIG. 12).

The elongate flexible member 50 (which may also be referred to as a sleeve) extends around the perimeter of the plurality of rigid members 14. The elongate flexible member 50 has a circular cross sectional shape when viewed in plan that increases in surface area from a first end to a second end of the elongate flexible member 50 (the elongate flexible member 50 consequently has a conical shape). The elongate flexible member 50 has a width that is substantially equal to the length of the plurality of rigid members 14 and may consequently extend over the whole length of the plurality of rigid members 14. The lock bolt 42 is arranged to fasten the two ends 52, 54 of the elongate flexible member 44 together.

Figure 13:
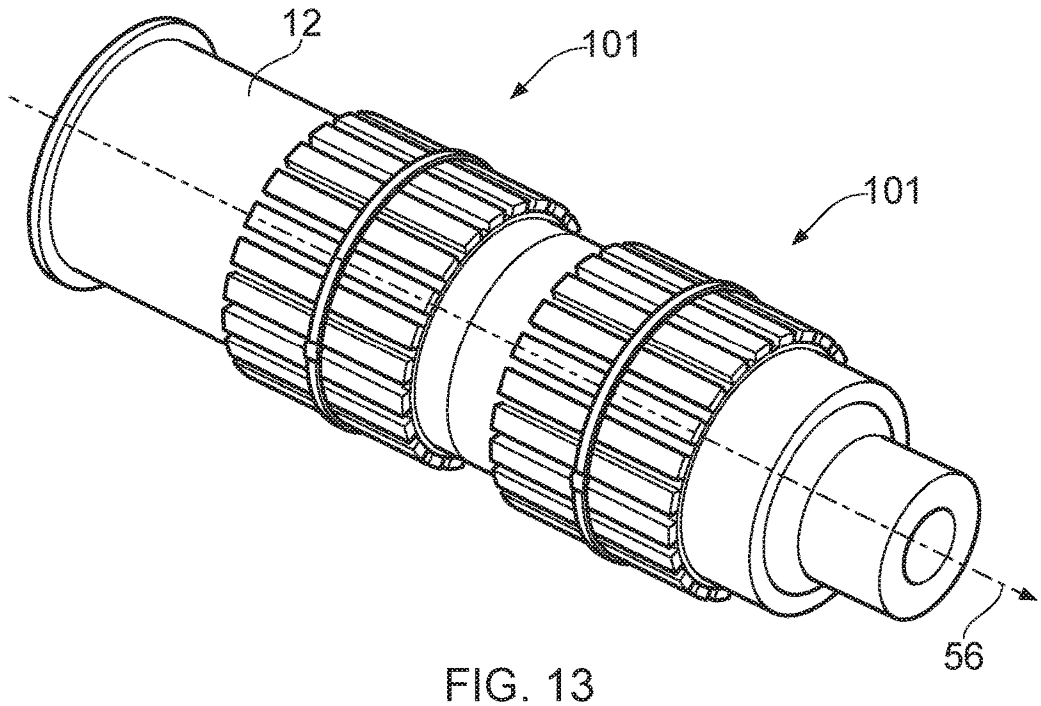
FIG. 13 illustrates a perspective view of a plurality of the second apparatus illustrated in FIG. 3, and an object.

FIG. 13 illustrates a perspective view of a plurality of the second apparatus 101 illustrated in FIG. 3, and an object 12. In this example, the object 12 has a circular cross sectional shape, is elongate (that is, the length of the object 12 is greater than the width of the object 12), and has a longitudinal axis 56 that extends along the length of the object 12. The plurality of second apparatus 101 are mounted around the circumference of the object 12 so that they are positioned adjacent one another at different positions along the longitudinal axis 56. Consequently, a plurality of second apparatus 101 may advantageously be used to dampen machining vibrations in a relatively long object (such as a shaft for interconnecting the fan and the low pressure turbine in a gas turbine engine).

Figure 14:
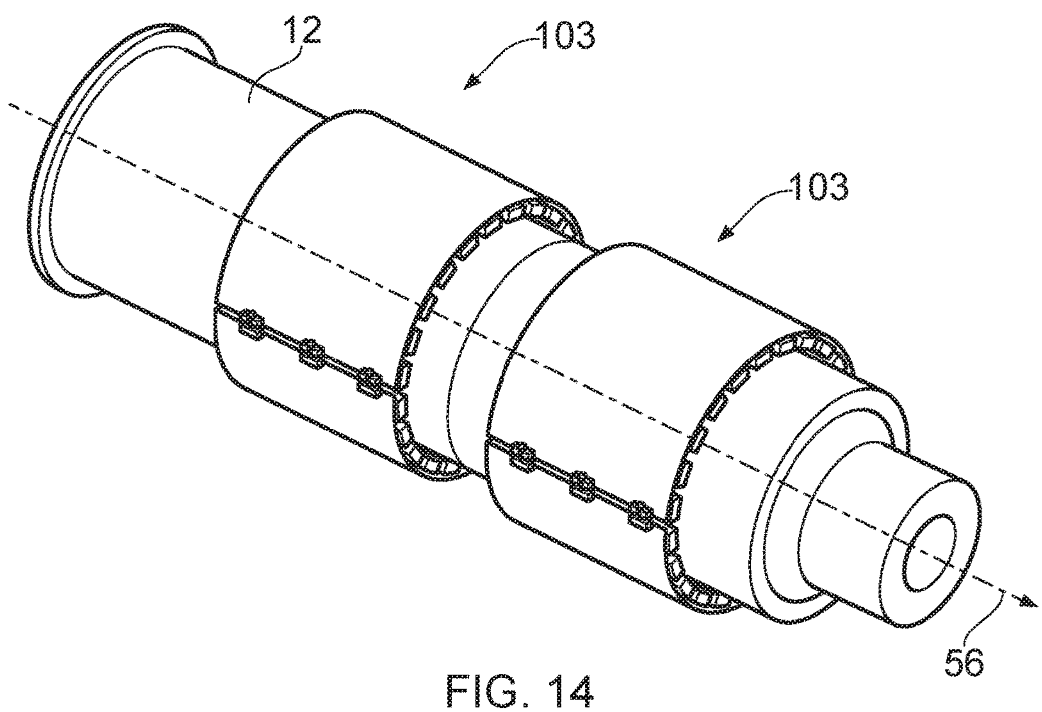
FIG. 14 illustrates a perspective view of a plurality of the fourth apparatus illustrated in FIG. 7, and an object.

FIG. 14 illustrates a perspective view of a plurality of the fourth apparatus 103 illustrated in FIG. 7, and an object 12. In this example, the object 12 has a circular cross sectional shape, is elongate (that is, the length of the object 12 is greater than the width of the object 12), and has a longitudinal axis 56 that extends along the length of the object 12. The plurality of fourth apparatus 103 are mounted around the circumference of the object 12 so that they are positioned adjacent one another at different positions along the longitudinal axis 56. Consequently, a plurality of fourth apparatus 103 may advantageously be used to dampen machining vibrations in a relatively long object (such as a shaft for interconnecting the fan and the low pressure turbine in a gas turbine engine).

Figure 15:
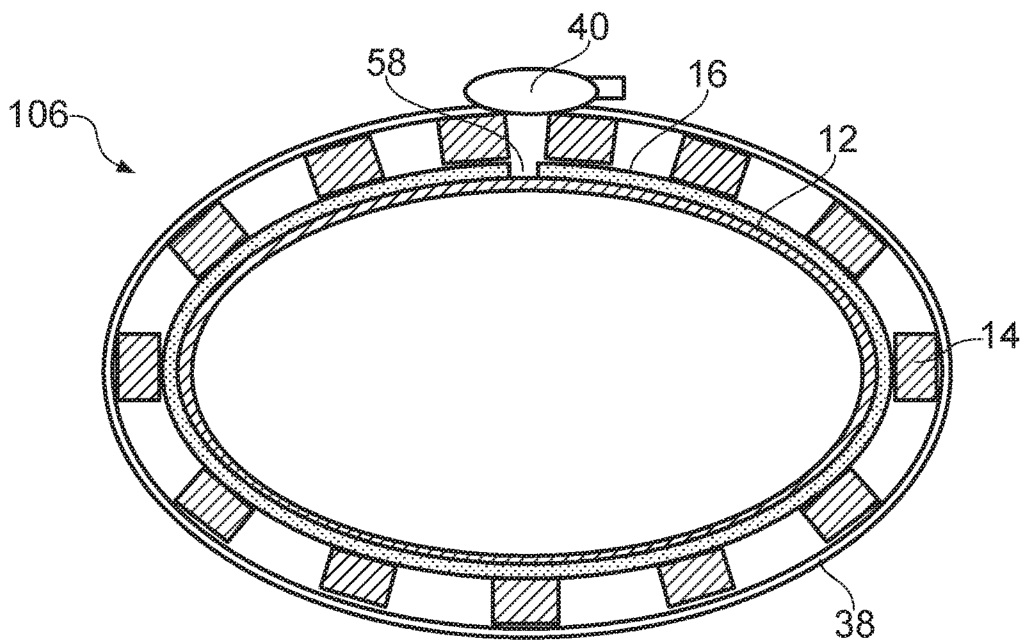
FIG. 15 illustrates a cross sectional side view of a seventh apparatus for damping machining vibration according to various examples.

FIG. 15 illustrates a cross sectional side view of a seventh apparatus 106 for damping machining vibration according to various examples, and an object 12. The seventh apparatus 106 is similar to the second apparatus 101 illustrated in FIGS. 3 and 4 and where the features are similar, the same reference numerals are used. The seventh apparatus 106 differs from the second apparatus 101 in that the flexible member 16, the plurality of rigid members 14, and the elongate flexible member 38 define an elliptical shape when viewed in cross section. Consequently, the seventh apparatus 106 may advantageously be used to dampen machining vibration in objects having an elliptical cross sectional shape.

In this example, the flexible member 16 has open ends 58 and the seventh apparatus 106 may be wrapped around the object 12 (and therefore the elliptical cross sectional shape of the seventh apparatus 106 may be formed by the object 12). In other examples, the flexible member 16 may be an endless loop and the object 12 may be inserted into the cavity 27 defined by the flexible member 16 (and therefore, the seventh apparatus 106 may independently have an elliptical cross sectional shape).

Figure 16:
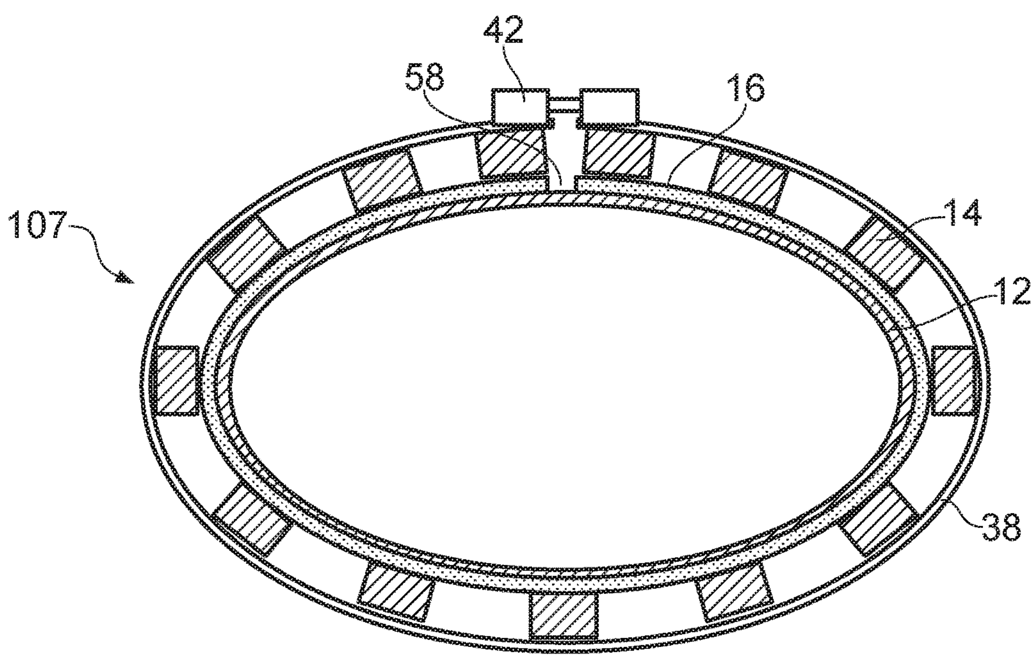
FIG. 16 illustrates a cross sectional side view of an eighth apparatus for damping machining vibration according to various examples.

FIG. 16 illustrates a cross sectional side view of an eighth apparatus 107 for damping machining vibration according to various examples, and an object 12. The eighth apparatus 107 is similar to the third apparatus 102 illustrated in FIGS. 5 and 6 and where the features are similar, the same reference numerals are used. The eighth apparatus 107 differs from the third apparatus 102 in that the flexible member 16, the plurality of rigid members 14, and the elongate flexible member 38 define an elliptical shape when viewed in cross section. Consequently, the eighth apparatus 107 may advantageously be used to dampen machining vibration in objects having an elliptical cross sectional shape.

In this example, the flexible member 16 has open ends 58 and the eighth apparatus 107 may be wrapped around the object 12 (and therefore the elliptical cross sectional shape of the seventh apparatus 106 may be formed by the object 12). In other examples, the flexible member 16 may be an endless loop and the object 12 may be inserted into the cavity 27 defined by the flexible member 16 (and therefore, the seventh apparatus 106 may independently have an elliptical cross sectional shape).

It will be understood that the invention is not limited to the embodiments above-described and various modifications and improvements can be made without departing from the concepts described herein. For example, a plurality of any of the apparatus 10, 101, 102, 103, 104, 105, 106 and 107 (and in any combination) may be mounted along a longitudinal axis of an elongate object to dampen machining vibrations in the elongate object. By way of another example, any of the apparatus 10, 101, 102, 103, 104, 105 may have an elliptical cross sectional shape instead of a circular cross sectional shape to dampen machining vibrations in an object having an elliptical cross sectional shape. By way of a further example, any of the apparatus 10, 101, 102, 103, 104, 105, 106, 107 may have a polygonal cross sectional shape to dampen machining vibrations in an object having a polygonal cross sectional shape.

Except where mutually exclusive, any of the features may be employed separately or in combination with any other features and the disclosure extends to and includes all combinations and sub-combinations of one or more features described herein.

What is claimed is:

1. An apparatus for damping machining vibration of an object, the apparatus comprising:

a plurality of rigid members to be positioned around the object to be machined, the plurality of rigid members defining an interior surface and an exterior surface;

one flexible member positioned adjacent to the interior surface of the plurality of rigid members, the one flexible member extending over at least a part of the interior surface of each of the plurality of rigid members and between each of the plurality of rigid members, the one flexible member being configured to contact an exterior surface of the object; and a single elongate compressor member extending around and connecting the exterior surface of all of the plurality of rigid members and the one flexible member, the elongate compressor member being configured to compress the one flexible member onto the exterior surface of the object.

2. The apparatus as claimed in claim 1, wherein the at least one flexible member comprises a resilient material.

3. The apparatus as claimed in claim 1, wherein the plurality of rigid members and the at least one flexible member define a circular cross sectional shape.

4. The apparatus as claimed in claim 1, wherein the plurality of rigid members and the at least one flexible member define an elliptical cross sectional shape.

5. The apparatus as claimed in claim 1, wherein the plurality of rigid members and the at least one flexible member define a cylindrical shape.

6. The apparatus as claimed in claim 1, wherein the plurality of rigid members and the at least one flexible member define a conical shape.

7. The apparatus as claimed in claim 1, wherein the compressor includes:

an elongate flexible member for extending around the plurality of rigid members and the at least one flexible member; and a fastener for fastening the elongate flexible member around the plurality of rigid members and the at least one flexible member.

8. The apparatus as claimed in claim 7, wherein the plurality of rigid members each have a length and the width, and the elongate flexible member has a width that is less than the length of the plurality of rigid members.

9. The apparatus as claimed in claim 7, wherein the plurality of rigid members each have a length and the width, and the elongate flexible member has a width that is substantially equal to the length of the plurality of rigid members.

10. The apparatus as claimed in claim 7, wherein the fastener includes a ratchet or a bolt lock for fastening opposing open ends of the elongate flexible member.

11. The apparatus as claimed in claim 1, further comprising a plurality of flexible members positioned adjacent the interior surface of the plurality of rigid members, the plurality of flexible members for contacting the exterior surface of the object.

12. An arrangement comprising:

the apparatus as claimed in claim 1; and an object to be machined, wherein the apparatus is positioned around the exterior surface of the object to dampen machining vibrations of the object.

13. The arrangement as claimed in claim 12, further comprising a further apparatus identical to the apparatus as claimed in claim 1, wherein the further apparatus is positioned around another surface of the object to dampen machining vibrations of the object.

14. The arrangement as claimed in claim 12, wherein the object is a component of a gas turbine engine.

15. The arrangement as claimed in claim 14, wherein the component is a casing or a shaft of the gas turbine engine.

16. A method for damping machining vibration of an object, the method comprising:

providing the apparatus as claimed in claim 1 around the object; and compressing the at least one flexible member of the apparatus onto the exterior surface of the object.

17. The method as claimed in claim 16, further comprising:

machining the object while the object is being compressed by the apparatus.

18. The apparatus as claimed in claim 1, wherein the flexible member extends over at least a part of the interior surfaces of the plurality of rigid members and between the plurality of rigid members.

* * * * *